(12) United States Patent
Brodie et al.

(10) Patent No.: US 12,458,487 B2
(45) Date of Patent: Nov. 4, 2025

(54) INTRAOCULAR ARTIFICIAL LENS CAPSULE

(71) Applicant: The Board of Trustees of the Leland Stanford Junior University, Stanford, CA (US)

(72) Inventors: Frank L. Brodie, Durham, NC (US); David Myung, Saratoga, CA (US); David Buickians, Glendale, CA (US)

(73) Assignees: The Board of Trustees of the Leland Stanford Junior University, Stanford, CA (US); The United States Government as represented by the Department Of Veterans Affairs, Washington, DC (US)

( * ) Notice: Subject to any disclaimer, the term of this patent is extended or adjusted under 35 U.S.C. 154(b) by 633 days.

(21) Appl. No.: 17/284,578

(22) PCT Filed: Oct. 13, 2019

(86) PCT No.: PCT/US2019/056020
§ 371 (c)(1),
(2) Date: Apr. 12, 2021

(87) PCT Pub. No.: WO2020/086312
PCT Pub. Date: Apr. 30, 2020

(65) Prior Publication Data
US 2021/0315687 A1 Oct. 14, 2021

Related U.S. Application Data

(60) Provisional application No. 62/806,772, filed on Feb. 16, 2019, provisional application No. 62/749,262, filed on Oct. 23, 2018.

(51) Int. Cl.
*A61F 2/16* (2006.01)
*A61L 27/16* (2006.01)

(52) U.S. Cl.
CPC ............... *A61F 2/16* (2013.01); *A61L 27/16* (2013.01); *A61F 2002/1683* (2013.01);
(Continued)

(58) Field of Classification Search
CPC ............... A61F 2/16; A61F 2002/169; A61F 2002/16901; A61F 2002/16902;
(Continued)

(56) References Cited

U.S. PATENT DOCUMENTS 3,673,616 A 7/1972 Fedorov et al.
3,866,249 A 2/1975 Flom
(Continued)

FOREIGN PATENT DOCUMENTS

CA 2 928 918 A1 3/2017
CN 2328346 Y 7/1999
(Continued)

OTHER PUBLICATIONS

New IOL dedicated for scleral fixation The lens design provides firm anchorage to the sclera without any sutures.
(Continued)

*Primary Examiner* — Jerrah Edwards
*Assistant Examiner* — Kia Xiong White (57) ABSTRACT

An implantable artificial capsule and a method of implantation are provided. The implantable artificial capsule has a ring with a central opening to accommodate an intraocular lens and at least three haptic arms extending substantially orthogonal from the outer surface of the ring. Each arm has transcleral anchors for sutureless scleral fixation. Upon implantation of the implantable artificial capsule the arms are externalized trans-sclerally and atraumatically. The arms sit subconjunctivally. The implantable artificial capsule does not have any sutures for fixation and is suturelessly implanted in an eye, which is a major advantage as it
(Continued)

significantly reduces complications during surgery and recovery.

16 Claims, 10 Drawing Sheets

(52) U.S. Cl.
CPC .................. *A61F 2002/169* (2015.04); *A61F 2002/16901* (2015.04); *A61F 2002/16902* (2015.04); *A61F 2230/0041* (2013.01); *A61F 2230/0052* (2013.01); *A61F 2250/0067* (2013.01); *A61F 2250/0091* (2013.01); *A61L 2430/16* (2013.01)

(58) Field of Classification Search
CPC ...... A61F 2230/0041; A61F 2230/0052; A61F 2250/0067; A61F 2250/0091; A61L 27/16; A61L 2430/16
See application file for complete search history.

(56) References Cited

U.S. PATENT DOCUMENTS

| | | | |
|---|---|---|---|
| 3,922,728 A | 12/1975 | Krasnov | |
| 3,925,825 A | 12/1975 | Richards et al. | |
| 3,986,214 A | 10/1976 | Krasnov | |
| 4,014,049 A | 3/1977 | Richards et al. | |
| 4,073,014 A | 2/1978 | Poler | |
| 4,110,848 A | 9/1978 | Jensen | |
| 4,118,808 A | 10/1978 | Poler | |
| 4,168,547 A | 9/1979 | Konstantinov et al. | |
| 4,190,049 A | 2/1980 | Hager et al. | |
| 4,215,440 A | 8/1980 | Worst | |
| 4,242,762 A | 1/1981 | Tennant | |
| 4,254,511 A | 3/1981 | Chase et al. | |
| 4,262,370 A | 4/1981 | Hartstein | |
| 4,298,996 A | 11/1981 | Barnet | |
| 4,437,194 A | 3/1984 | Hahs | |
| 4,576,607 A | 3/1986 | Kelman | |
| 4,585,457 A | 4/1986 | Kalb | |
| 4,617,023 A | 10/1986 | Peyman | |
| 4,629,460 A | 12/1986 | Dyer | |
| 4,718,905 A | 1/1988 | Freeman | |
| 4,737,322 A | 4/1988 | Bruns et al. | |
| 4,790,847 A | 12/1988 | Woods | |
| 4,878,910 A | 11/1989 | Koziol | |
| 4,932,971 A | 6/1990 | Kelman | |
| 5,026,396 A | 6/1991 | Darin | |
| 5,152,787 A | 10/1992 | Hamblen | |
| 5,222,981 A | 6/1993 | Werblin | |
| 5,258,025 A | 11/1993 | Fedorov | |
| 5,275,624 A | 1/1994 | Hara | |
| 5,326,347 A | 7/1994 | Cumming | |
| 5,336,262 A | 8/1994 | Chu | |
| 5,466,233 A | 11/1995 | Weiner | |
| 5,507,805 A | 4/1996 | Koeniger | |
| 5,628,795 A | 5/1997 | Langerman | |
| 5,628,798 A | 5/1997 | Eggleston et al. | |
| 5,697,973 A | 12/1997 | Peyman | |
| 5,752,960 A | 5/1998 | Nallakrishnan | |
| 5,776,191 A | 7/1998 | Mazzocco | |
| 5,843,184 A | 12/1998 | Cionni | |
| 6,027,531 A | 2/2000 | Tassignon | |
| 6,066,171 A | 5/2000 | Lipshitz | |
| 6,113,633 A | 9/2000 | Portney | |
| 6,136,026 A | 10/2000 | Israel | |
| 6,152,959 A | 11/2000 | Portney | |
| 6,228,115 B1 | 5/2001 | Hoffmann et al. | |
| 6,261,321 B1 | 7/2001 | Kellan | |
| 6,264,693 B1 | 7/2001 | Ross | |
| 6,299,641 B1 | 10/2001 | Woods | |
| 6,342,058 B1 | 1/2002 | Portney | |
| 6,398,809 B1 | 6/2002 | Hoffmann et al. | |
| 6,443,985 B1 | 9/2002 | Woods | |
| 6,488,708 B2 | 12/2002 | Sarfarazi | |
| 6,551,354 B1 | 4/2003 | Ghazizadeh et al. | |
| 6,596,026 B1 | 7/2003 | Gross | |
| 6,616,691 B1 | 9/2003 | Tran | |
| 6,616,692 B1 | 9/2003 | Glick et al. | |
| 6,660,036 B2 | 12/2003 | Cumming | |
| 6,685,741 B2 | 2/2004 | Landreville et al. | |
| 6,767,363 B1 | 7/2004 | Bandhauer et al. | |
| 6,797,004 B1 | 9/2004 | Brady et al. | |
| 6,881,225 B2 | 4/2005 | Okada | |
| 6,921,415 B2 | 7/2005 | Callahan et al. | |
| 6,972,033 B2 | 12/2005 | McNicholas | |
| 7,125,422 B2 | 10/2006 | Woods et al. | |
| 7,223,288 B2 | 5/2007 | Zhang et al. | |
| 7,300,464 B2 | 11/2007 | Tran | |
| 7,311,194 B2 | 12/2007 | Jin et al. | |
| 7,354,451 B2 | 4/2008 | Koch | |
| 7,416,561 B2 | 8/2008 | Worst | |
| 7,462,194 B1 | 12/2008 | Blake | |
| 7,569,048 B2 | 8/2009 | Brown | |
| 7,597,678 B2 | 10/2009 | Brown | |
| 7,662,179 B2 | 2/2010 | Sarfarazi | |
| 7,763,069 B2 | 7/2010 | Brady et al. | |
| 7,794,498 B2 | 9/2010 | Pinchuk | |
| 7,806,929 B2 | 10/2010 | Brown | |
| 7,806,930 B2 | 10/2010 | Brown | |
| 7,875,270 B2 | 1/2011 | Zhang | |
| 7,931,686 B2 | 4/2011 | Vaudant et al. | |
| 8,012,204 B2 | 9/2011 | Weinschenk, III et al. | |
| 8,109,998 B2 | 2/2012 | Cumming | |
| 8,128,693 B2 | 3/2012 | Tran et al. | |
| 8,162,927 B2 | 4/2012 | Peyman | |
| 8,216,305 B2 | 7/2012 | Salvati et al. | |
| 8,273,123 B2 | 9/2012 | Ben Nun | |
| 8,377,125 B2 | 2/2013 | Kellan | |
| 8,551,164 B2 | 10/2013 | Willis et al. | |
| 8,585,758 B2 | 11/2013 | Woods | |
| 8,663,235 B2 | 3/2014 | Tassignon | |
| 8,728,158 B2 | 5/2014 | Whitsett | |
| 8,764,823 B2 | 7/2014 | Cumming | |
| 8,778,022 B2 | 7/2014 | Blum | |
| 8,821,166 B2 | 9/2014 | Akura et al. | |
| 8,852,275 B2 | 10/2014 | Park | |
| 8,888,845 B2 | 11/2014 | Vaquero et al. | |
| 8,900,300 B1 | 12/2014 | Wortz | |
| 8,920,495 B2 | 12/2014 | Mirlay | |
| 8,932,351 B2 | 1/2015 | Dell | |
| 8,945,215 B2 | 2/2015 | Basinger | |
| 9,034,035 B2 | 5/2015 | Betser et al. | |
| 9,039,762 B2 | 5/2015 | Hong et al. | |
| 9,072,600 B2 | 7/2015 | Tran | |
| 9,078,744 B2 | 7/2015 | Van Noy | |
| 9,084,673 B2 | 7/2015 | Dell | |
| 9,095,424 B2 | 8/2015 | Kahook et al. | |
| 9,125,736 B2 | 9/2015 | Kahook | |
| 9,198,752 B2 | 12/2015 | Woods | |
| 9,289,287 B2 | 3/2016 | Kahook | |
| 9,326,845 B2 * | 5/2016 | Ichikawa | A61F 2/1613 |
| 9,333,072 B2 | 5/2016 | Ichikawa | |
| 9,339,375 B2 | 5/2016 | Lee | |
| 9,358,103 B1 | 6/2016 | Wortz et al. | |
| 9,364,316 B1 | 6/2016 | Kahook et al. | |
| 9,364,318 B2 | 6/2016 | Beer | |
| 9,387,069 B2 | 7/2016 | Kahook et al. | |
| 9,398,949 B2 | 7/2016 | Werblin | |
| 9,421,088 B1 | 8/2016 | Kahook et al. | |
| 9,439,754 B2 | 9/2016 | Wortz | |
| 9,445,891 B2 | 9/2016 | Ichikawa | |
| 9,445,892 B2 | 9/2016 | Brown | |
| 9,468,523 B2 | 10/2016 | Dell | |
| 9,498,325 B2 | 11/2016 | Salvati et al. | |
| 9,504,558 B2 | 11/2016 | Wortz et al. | |
| 9,517,127 B2 | 12/2016 | Wortz et al. | |
| 9,522,060 B2 | 12/2016 | Wortz | |
| 9,622,857 B2 | 4/2017 | Coroneo | |
| 9,629,711 B2 | 4/2017 | Cumming | |
| 9,681,945 B2 | 6/2017 | Shahinpoor et al. | |
| 9,681,946 B2 | 6/2017 | Kahook et al. | |

(56) References Cited

U.S. PATENT DOCUMENTS

| | | |
|---|---|---|
| 9,713,526 B2 | 7/2017 | Rombach |
| 9,744,027 B2 | 8/2017 | Jansen |
| 9,757,227 B2 | 9/2017 | Kushlin |
| 9,877,825 B2 | 1/2018 | Kahook et al. |
| 9,925,037 B2 | 3/2018 | Wortz et al. |
| 9,925,040 B2 | 3/2018 | Kahook et al. |
| 9,962,256 B2 | 5/2018 | McCafferty |
| 10,004,591 B2 | 6/2018 | Ichikawa |
| 10,010,405 B2 | 7/2018 | Hayes |
| 10,080,648 B2 | 9/2018 | Kahook et al. |
| 10,085,886 B2 | 10/2018 | Schuele et al. |
| 10,201,415 B2 | 2/2019 | Aharoni et al. |
| 10,271,944 B2 | 4/2019 | Ichikawa et al. |
| 10,271,945 B2 | 4/2019 | Wortz et al. |
| 10,286,107 B2 | 5/2019 | Kahook et al. |
| 10,299,910 B2 | 5/2019 | Cady |
| 10,383,721 B2 | 8/2019 | Marcos Celestino et al. |
| 10,433,950 B2 | 10/2019 | Shadduck |
| 10,449,036 B2 | 10/2019 | Christie et al. |
| 10,470,873 B2 | 11/2019 | Ichikawa et al. |
| 10,524,900 B2 | 1/2020 | Beer |
| 10,548,713 B2 | 2/2020 | Aharoni |
| 10,575,943 B2 | 3/2020 | Ingram |
| 10,603,162 B2* | 3/2020 | Wortz .................. A61F 2/1694 |
| 10,765,509 B2 | 9/2020 | Olson |
| 10,799,340 B2 | 10/2020 | Collins |
| 10,973,624 B1 | 4/2021 | Clarke |
| 11,364,110 B2 | 6/2022 | Webb |
| 11,382,736 B2 | 7/2022 | Zacher |
| 11,759,311 B2 | 9/2023 | Whitsett |
| 11,833,029 B2 | 12/2023 | Dudee |
| 2002/0087210 A1 | 7/2002 | Stenger et al. |
| 2002/0103535 A1 | 8/2002 | Portney |
| 2002/0161433 A1 | 10/2002 | Baikoff et al. |
| 2003/0055499 A1 | 3/2003 | Nguyen et al. |
| 2003/0158560 A1 | 8/2003 | Portney |
| 2003/0158599 A1 | 8/2003 | Brady et al. |
| 2003/0220652 A1 | 11/2003 | Israel |
| 2004/0042073 A1 | 3/2004 | Pynson |
| 2004/0064182 A1 | 4/2004 | Kelman |
| 2004/0148022 A1 | 7/2004 | Eggleston |
| 2004/0236422 A1 | 11/2004 | Zhang et al. |
| 2004/0249455 A1 | 12/2004 | Tran |
| 2005/0021138 A1 | 1/2005 | Woods |
| 2005/0021140 A1 | 1/2005 | Liao |
| 2005/0085907 A1 | 4/2005 | Hanna |
| 2005/0177229 A1 | 8/2005 | Boxer Wachler |
| 2006/0047340 A1 | 3/2006 | Brown |
| 2006/0235515 A1 | 10/2006 | Chassain |
| 2007/0027541 A1 | 2/2007 | Aharoni et al. |
| 2007/0032868 A1 | 2/2007 | Woods |
| 2007/0123982 A1 | 5/2007 | Yablonski et al. |
| 2007/0162115 A1 | 7/2007 | Hermeking |
| 2007/0260308 A1 | 11/2007 | Tran |
| 2008/0086208 A1 | 4/2008 | Nordan |
| 2008/0154364 A1 | 6/2008 | Richardson et al. |
| 2009/0171458 A1 | 7/2009 | Kellan et al. |
| 2009/0198247 A1 | 8/2009 | Ben Nun |
| 2009/0204209 A1 | 8/2009 | Tran |
| 2010/0030331 A1 | 2/2010 | Zhang et al. |
| 2010/0094415 A1 | 4/2010 | Bumbalough |
| 2010/0121444 A1 | 5/2010 | Ben Nun |
| 2010/0131059 A1 | 5/2010 | Callahan et al. |
| 2010/0152848 A1 | 6/2010 | Williamson et al. |
| 2010/0262234 A1 | 10/2010 | Tran et al. |
| 2011/0295368 A1 | 12/2011 | Betser |
| 2011/0313521 A1* | 12/2011 | Angelopoulos ....... A61F 2/1694 |
| | | 623/6.43 |
| 2011/0313522 A1 | 12/2011 | Hayes |
| 2011/0313523 A1 | 12/2011 | Hayes |
| 2012/0290086 A1 | 11/2012 | Malyugin et al. |
| 2012/0303119 A1 | 11/2012 | Callahan |
| 2012/0330415 A1 | 12/2012 | Callahan |
| 2013/0190868 A1 | 7/2013 | Kahook et al. |
| 2014/0094908 A1 | 4/2014 | Zaldivar et al. |
| 2014/0316520 A1 | 10/2014 | Barsam |
| 2014/0330375 A1 | 11/2014 | McCafferty |
| 2014/0371851 A1 | 12/2014 | Aharoni |
| 2014/0371852 A1* | 12/2014 | Aharoni .................. A61F 2/14 |
| | | 623/6.43 |
| 2015/0025627 A1 | 1/2015 | Christie et al. |
| 2015/0127102 A1 | 5/2015 | Wortz |
| 2015/0265398 A1 | 9/2015 | Hartkens et al. |
| 2015/0305856 A1* | 10/2015 | Ichikawa .............. A61F 2/1613 |
| | | 623/6.44 |
| 2015/0305857 A1 | 10/2015 | Ichikawa |
| 2015/0366656 A1 | 12/2015 | Wortz et al. |
| 2015/0366659 A1 | 12/2015 | Wortz et al. |
| 2016/0000558 A1 | 1/2016 | Honigsbaum |
| 2016/0128828 A1 | 5/2016 | Dalvi |
| 2016/0157995 A1 | 6/2016 | Beer |
| 2016/0184089 A1 | 6/2016 | Dudee |
| 2016/0331520 A1 | 11/2016 | Beer |
| 2016/0338825 A1 | 11/2016 | Wortz et al. |
| 2016/0361156 A1 | 12/2016 | Brown |
| 2017/0020662 A1 | 1/2017 | Shadduck |
| 2017/0049560 A1 | 2/2017 | Cherne |
| 2017/0258575 A1 | 9/2017 | Wortz et al. |
| 2017/0319332 A1 | 11/2017 | Kahook |
| 2017/0348095 A1 | 12/2017 | Wortz et al. |
| 2018/0014928 A1 | 1/2018 | Kahook et al. |
| 2018/0110613 A1 | 4/2018 | Wortz et al. |
| 2018/0263757 A1 | 9/2018 | Wanders |
| 2018/0271642 A1 | 9/2018 | Wortz et al. |
| 2018/0338825 A1 | 11/2018 | Aharoni |
| 2019/0015197 A1 | 1/2019 | Wortz et al. |
| 2019/0076236 A1 | 3/2019 | Scharioth et al. |
| 2019/0076239 A1 | 3/2019 | Wortz et al. |
| 2019/0083235 A1 | 3/2019 | Wortz |
| 2019/0091009 A1 | 3/2019 | Collins et al. |
| 2019/0133754 A1 | 5/2019 | Dalvi |
| 2019/0151079 A1 | 5/2019 | Zaldivar |
| 2019/0254809 A1 | 8/2019 | Dworschak et al. |
| 2019/0343621 A1 | 11/2019 | Wortz et al. |
| 2020/0000575 A1 | 1/2020 | Kojima |
| 2020/0022840 A1 | 1/2020 | Kahook |
| 2020/0121446 A1 | 4/2020 | Cady |
| 2020/0253721 A1 | 8/2020 | Cuevas |
| 2020/0323626 A1 | 10/2020 | Akinay |
| 2021/0338416 A1 | 11/2021 | Clarke |
| 2021/0338417 A1* | 11/2021 | Clarke .................. A61F 2/15 |
| 2021/0353406 A1 | 11/2021 | Brodie |
| 2022/0000605 A1 | 1/2022 | Clarke |
| 2022/0079744 A1 | 3/2022 | Arrieta |
| 2022/0211487 A1 | 7/2022 | Clarke |
| 2022/0362010 A1 | 11/2022 | Akura |
| 2023/0031555 A1 | 2/2023 | Wortz |
| 2023/0127407 A1 | 4/2023 | So |
| 2024/0058115 A1 | 2/2024 | Kim |

FOREIGN PATENT DOCUMENTS

| | | |
|---|---|---|
| CN | 101031257 A | 9/2007 |
| CN | 102090942 A | 6/2011 |
| CN | 102090946 A * | 6/2011 |
| CN | 102090946 | 10/2012 |
| CN | 204698755 | 10/2015 |
| CN | 204698755 U | 10/2015 |
| CN | 110811924 | 2/2020 |
| DE | 202016105208 | 11/2016 |
| DE | 102019115408 | 9/2020 |
| EP | 0 106 488 A1 | 4/1984 |
| EP | 0 346 245 A1 | 12/1989 |
| EP | 0 089 335 B2 | 3/1993 |
| EP | 0 931 521 A1 | 7/1999 |
| EP | 1138282 | 11/2001 |
| EP | 1 341 485 B1 | 11/2006 |
| EP | 2422746 | 2/2012 |
| EP | 3 061 420 A1 | 8/2016 |
| EP | 2 117 465 B1 | 7/2017 |
| EP | 3158974 | 1/2018 |
| EP | 3 171 821 B1 | 3/2020 |
| EP | 3700466 | 8/2021 |
| FR | 2997624 | 5/2014 |

(56) References Cited

FOREIGN PATENT DOCUMENTS

| | | | |
|---|---|---|---|
| FR | 3 033 694 A1 | 9/2016 | |
| GB | 124500 A | 4/1919 | |
| IT | 102014902224032 A1 | 7/2015 | |
| JP | 2006525824 | 6/2009 | |
| JP | 4892156 B2 | 3/2012 | |
| JP | 2013123616 A | 6/2013 | |
| JP | 5383782 B2 | 1/2014 | |
| JP | 2014090772 A | 5/2014 | |
| JP | 2015223341 | 11/2015 | |
| JP | 2019063534 | 2/2022 | |
| KR | 20030051903 A | 6/2003 | |
| KR | 10-2011-0075018 A | 7/2011 | |
| KR | 10-1555298 B1 | 9/2015 | |
| RU | 86462 U1 | 9/2009 | |
| RU | 2367380 C2 | 9/2009 | |
| RU | 2440076 C1 | 1/2012 | |
| WO | WO-99/56670 A1 | 11/1999 | |
| WO | WO-00/30566 A1 | 6/2000 | |
| WO | WO-2006/103674 A2 | 10/2006 | |
| WO | WO-2007/005893 A2 | 1/2007 | |
| WO | WO2008077795 | 7/2008 | |
| WO | WO-2008/108525 A1 | 9/2008 | |
| WO | WO2011101310 | 8/2011 | |
| WO | WO-2013/112589 A1 | 8/2013 | |
| WO | WO-2014/197170 A1 | 12/2014 | |
| WO | WO2015026226 | 2/2015 | |
| WO | WO-2016/071755 A1 | 5/2016 | |
| WO | WO-2016/159910 A1 | 10/2016 | |
| WO | WO-2016/182520 A1 | 11/2016 | |
| WO | WO2016182520 | 11/2016 | |
| WO | WO-2017/212352 A1 | 12/2017 | |
| WO | WO2019050925 | 3/2019 | |
| WO | WO-2019050925 A1 * | 3/2019 | ............... A61F 2/16 |
| WO | WO-2019/094768 A1 | 5/2019 | |
| WO | WO2019097099 | 5/2019 | |
| WO | WO2019106011 | 6/2019 | |
| WO | WO2019235912 | 12/2019 | |

OTHER PUBLICATIONS

Carlevale, C., et al. (Nov. 15, 2018), "New IOL dedicated for scleral fixation," Ocular Surgery News. Web. Nov. 2, 2020. 4 pages. https://www.healio.com/news/ophthalmology/20181113/new-iol-dedicated-for-scleral-fixation?M_BT=3592487855654.

Carlevale Lens (Carlo Carlevale) by Soleko, "Scleral Suturefree IOL—Product Description." Alyko Medical, www.alykomedical.com/en-GB/products/implants/scleral-sutureless-iol-34097888. Accessed Oct. 29, 2020. 1 page.

Alwitry, Amir (n.d.) IC-8 pinhole IOL. 1 page. https://amaralwitry.com/about/our-procedures/premium-lenses-refractive-procedures/ic-8-pinhole-iol.

Can, E. (2018). "Flapless and sutureless intrascleral fixation of posterior chamber intraocular lens for correction of aphakia." Journal of Cataract and Refractive Surgery, 44(8), 929-931.

Entokey. (2017). Intraocular Lens Implantation in the Capsular Bag and Posterior Capsulotomy Techniques. https://entokey.com/intraocular-lens-implantation-in-the-capsular-bag-and-posterior-capsulotomy-techniques/.

Gabor, S.G. et al. (2007). "Sutureless intrascleral posterior chamber intraocular lens fixation." Journal of Cataract and Refractive Surgery, 33(11), 1851-1854.

Hu, Z. X. et al. (2018). "Sutureless Intrascleral Haptic-Hook Lens Implantation Using 25-Gauge Trocars." Journal of Ophthalmology, 2018, 9250425. 5 pages.

Omega Ophthalmics. (n.d.) The Gemini Refractive Capsule™ Revolutionary, Not Evolutionary. 1 page. https://www.omegaophthalmics.com/video/.

Schaaf, Tracy. (Oct. 23, 2018). 'In MedTech History'—Ophthalmic Implants—Part 2. MyStrategist. 3 pages. https://www.mystrategist.com/blog/article/ophthalmic-part-2.

* cited by examiner

Prior to IOL insertion

Upper Segmen

Lower Segment

FIG. 4

With IOL insertion

FIG. 5

Prior to IOL insertion

FIG. 6

With IOL insertion

INTRAOCULAR ARTIFICIAL LENS CAPSULE

CROSS-REFERENCE TO RELATED APPLICATIONS

This application is a 371 of PCT application PCT/US2019/056020 filed Oct. 13, 2019. PCT application PCT/US2019/056020 claims the benefit of U.S. Provisional application 62/749,262 filed Oct. 23, 2018. PCT application PCT/US2019/056020 claims the benefit of U.S. Provisional application 62/806,772 filed Feb. 16, 2019.

FIELD OF THE INVENTION

This invention relates to intraocular artificial lens capsules.

BACKGROUND OF THE INVENTION

Implantation of an intraocular lens (IOL) requires support within the eye to hold it in the correct position. Normally, this is achieved through the native capsular bag suspended by the zonules (fine thread-like structures). However, these support structures can be compromised either due to intrinsic factors such as pseudoexfoliation, Marfan, or Weill Marchesani syndromes, or extrinsic factors such as trauma. Additionally, lens support can be compromised iatrogenically either during the time of surgery (either anterior or posterior segment surgery) or as a late complication of previous surgery.

The management of secondary IOL placement in the absence of sufficient capsular or zonular support continues to evolve. Currently, several options exist, each with significant drawbacks. The anterior chamber Intraocular Lens (ACIOL) is a larger lens with the ability to sit anterior to the iris, however, over time these lenses can cause uveitis, glaucoma, hyphema (UGH) syndrome as well as endothelial cell loss and corneal decompensation. Iris sutured lenses are technically difficult and can lead to iris pigment loss causing glaucoma. Lastly, eye wall (scleral) sutured lenses are technically complex, risk rotation, and the durability of the sutures is unknown, with reported cases of breakage. Additionally, all these techniques force the surgeon to use an alternative lens type not their preferred lens for the patient. Lastly, the decision of timing is critical—frequently lens calculations are inadequate during the initial vitrectomy/lensectomy yet there is the desire to not subject the patient to additional posterior segment surgery, so non-ideal lenses are frequently implanted. An ideal solution would replicate normal anatomy, be technically easy, provide long term secure placement and allow for lens selection with accurate preoperative calculations without requiring additional vitreoretinal surgery. The present invention provides a solution in that direction.

SUMMARY OF THE INVENTION

The present invention provides an implantable artificial capsule. The implantable artificial capsule has a ring with a central opening to accommodate an intraocular lens and at least three haptic arms extending substantially orthogonal from the outer surface of the ring.

Each arm has transcleral anchors for sutureless scleral fixation. Upon implantation of the implantable artificial capsule the arms are externalized trans-sclerally and atraumatically. The arms sit subconjunctivally. The implantable artificial capsule does not have any sutures for fixation and is suturelessly implanted in an eye, which is a major advantage as it significantly reduces complications during surgery and recovery.

The transcleral anchors of each arm are T-shaped, anchor-shaped or fish-hook shaped, or nail-head-shaped. In one embodiment, the central opening has an inward facing groove to accommodate intraocular lens haptics or other intraocular implants.

In another aspect of the invention, a method of implanting an artificial capsule is provided. The method provides an artificial capsule as defined supra, implanting the artificial capsule within an eye, and suturelessly fixating each arm with their respective transcleral anchors. The arms upon implantation of the implantable artificial capsule are externalized trans-sclerally and atraumatically, and sit subconjunctivally of the eye. During surgery and after implantation, the implantable artificial capsule does not have any sutures for fixation.

Problems with prior art devices are, for example:
Anterior chamber intraocular lens: the lens is placed in front of the iris. These implants cause corneal decompensation, glaucoma and bleeding over time due to their instability in the eye.
Iris sutured lens: technically difficult and risks bleeding and glaucoma due to chafing of the iris.
Scleral sutured lens: technically difficult and cases of suture erosion/breakage require additional surgery and risk potentially blinding infection.

Embodiments of the invention have at least one or more of the following advantages:
Suture-less device which eliminates the risk of suture breakage.
A sutureless fixation method allowing for easier placement and secure attachment without concern for loosening or breaking of sutures.
A reliable refractive result based on known position without concern.
Posterior segment placement that greatly reduces risk of damage to iris, angle or cornea.
Ability to accommodate wide variety of intraocular lenses.
Replicates natural lens capsule.
Implantation posterior to iris and cornea eliminating or reducing risk of corneal injury, iris bleeding or glaucoma.
Device stably holds intraocular lens.
Because the device is a capsule only, the lens of choice can be implanted at the time of surgery or at a later date.
Haptics can be externalized as needed for scleral support/fixation.
Less complications than current technologies such as ACIOL, Iris-sutured lens, or Scleral-sutured lens.

DETAILED DESCRIPTION

The present invention is an artificial capsule with sutureless scleral fixation which would recapitulate normal anatomy. The artificial capsule has a central ring to support the intraocular lens while, in one embodiment, 3 haptics (arms) would be externalized trans-sclerally and sit subconjunctivally, ensuring a secure position while remaining covered to prevent erosion or infection. Sutureless placement would be rapid and technically straightforward. The artificial capsule would be made of a flexible biocompatible material such as silicon, polymethylmethacrylate or acrylic (both common IOL materials currently used). Other features of suitable materials are biocompatible, opaque or transparent. It could be inserted through a standard corneal incision and the haptics would be externalized through small gauge sclerotomy incisions. The capsule would accommodate a variety of common IOLs. The artificial capsule allows for the implantation of the IOL at the same time as placement, or IOL insertion could be delayed until a later date and only require a short anterior segment procedure for insertion.

Applications

Embodiments of the invention have applications in cataract surgery when there is absent or severely compromised capsular support. This occurs in cases of trauma, surgical complication or with disease processes such as pseudoexfoliation or marfans syndrome.

The artificial capsule is intended to provide support and centration for an intraocular lens (IOL) without use of the native capsular bag. It is intended to be used in cases of deficient capsular and/or zonular support, either congenital or secondary to disease, trauma or iatrogenic injury. The artificial capsule can hold the lens in the sulcus plane or in the posterior chamber. The artificial capsule haptics can sit a-traumatically within the eye or one or more haptics can be externalized for scleral fixation. The IOL can be placed within the artificial capsule either at the time of implantation or at a later date. The IOL can be exchanged without removal of the artificial capsule.

Prophetic examples:

Prophetic examples: A patient that sustained eye trauma leading to lens dislocation with complete loss of zonules undergoes lensectomy and vitrectomy. The artificial capsule is folded and inserted through a small standard corneal incision. The artificial capsule haptics are externalized through small gauge sclerotomies and are left subconjunctivally to minimize irritation and infection risk. The patient recovers from surgery and once the eye is no longer inflamed undergoes appropriate biometry to determine correct intraocular lens implant. A simple subsequent procedure inserts the correct lens into the artificial capsule.

A patient with pseudoexfoliation syndrome has a late IOL dislocation due to zonular instability. The patient undergoes vitrectomy and retrieval of the IOL. The artificial capsule is folded and inserted through a small standard corneal incision. The artificial capsule haptics are externalized through small gauge sclerotomies. The recovered IOL is placed in the artificial capsule.

A cataract surgery is complicated by 180 degrees of zonular loss. Sulcus lens placement is not possible and a history of glaucoma precludes Anterior Chamber IOL (ACIOL) placement. Scleral sutured lens would require an additional surgery by a vitreoretinal surgeon. Instead the artificial capsule is placed in the sulcus with 1 haptic externalized to provide support in the area of zonular loss. The IOL is then inserted into the artificial capsule.

Design Examples

Figure 1:
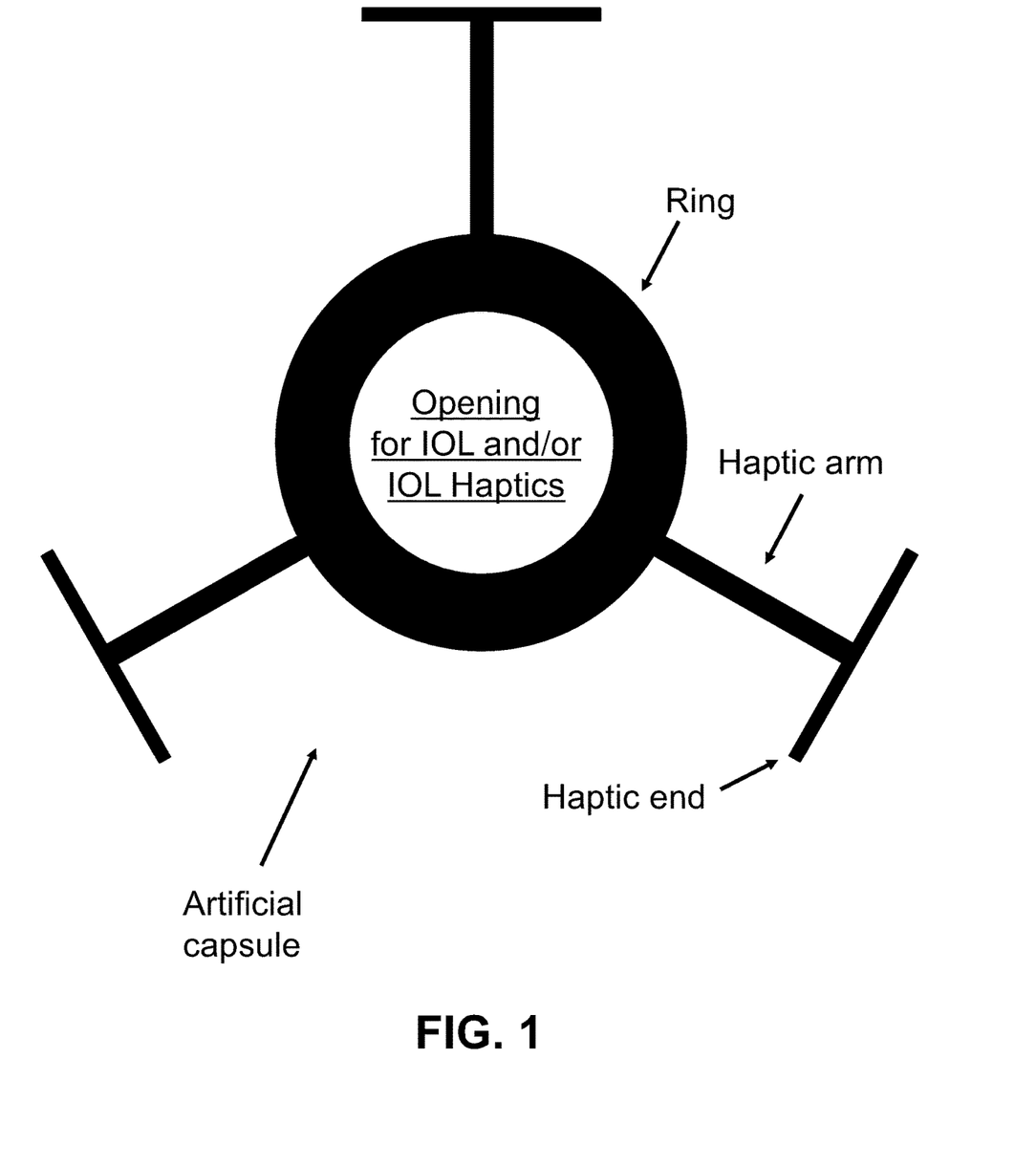
FIG. 1 shows the artificial capsule according to exemplary embodiments of the invention.
Figure 2:
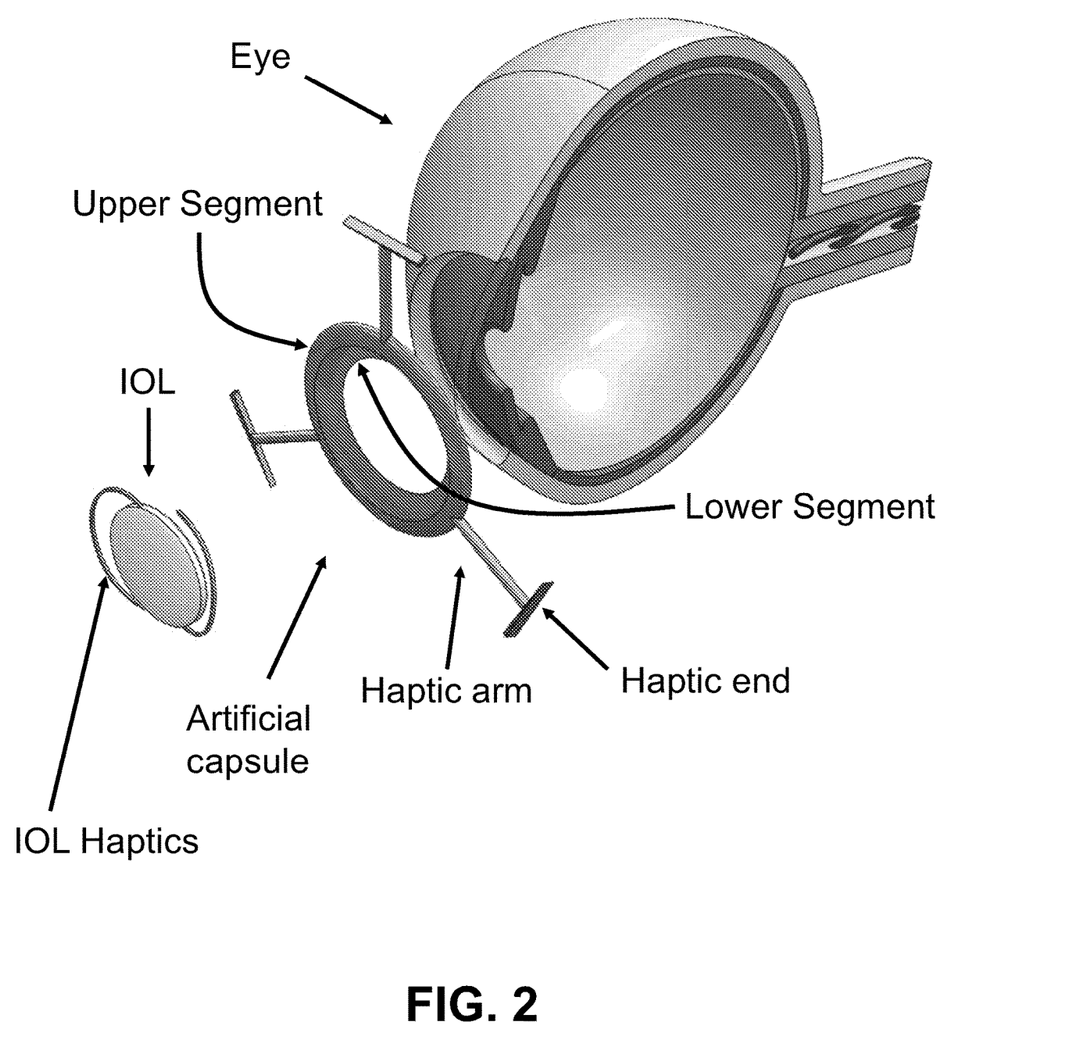
FIGS. 2-5 show the artificial capsule and the physical implementation of the artificial capsule according to a first exemplary embodiment of the invention. The first exemplary embodiment pertains to an artificial capsule with a central opening that has an inward facing groove to accommodate intraocular lens haptics or other intraocular implants.
Figure 3:
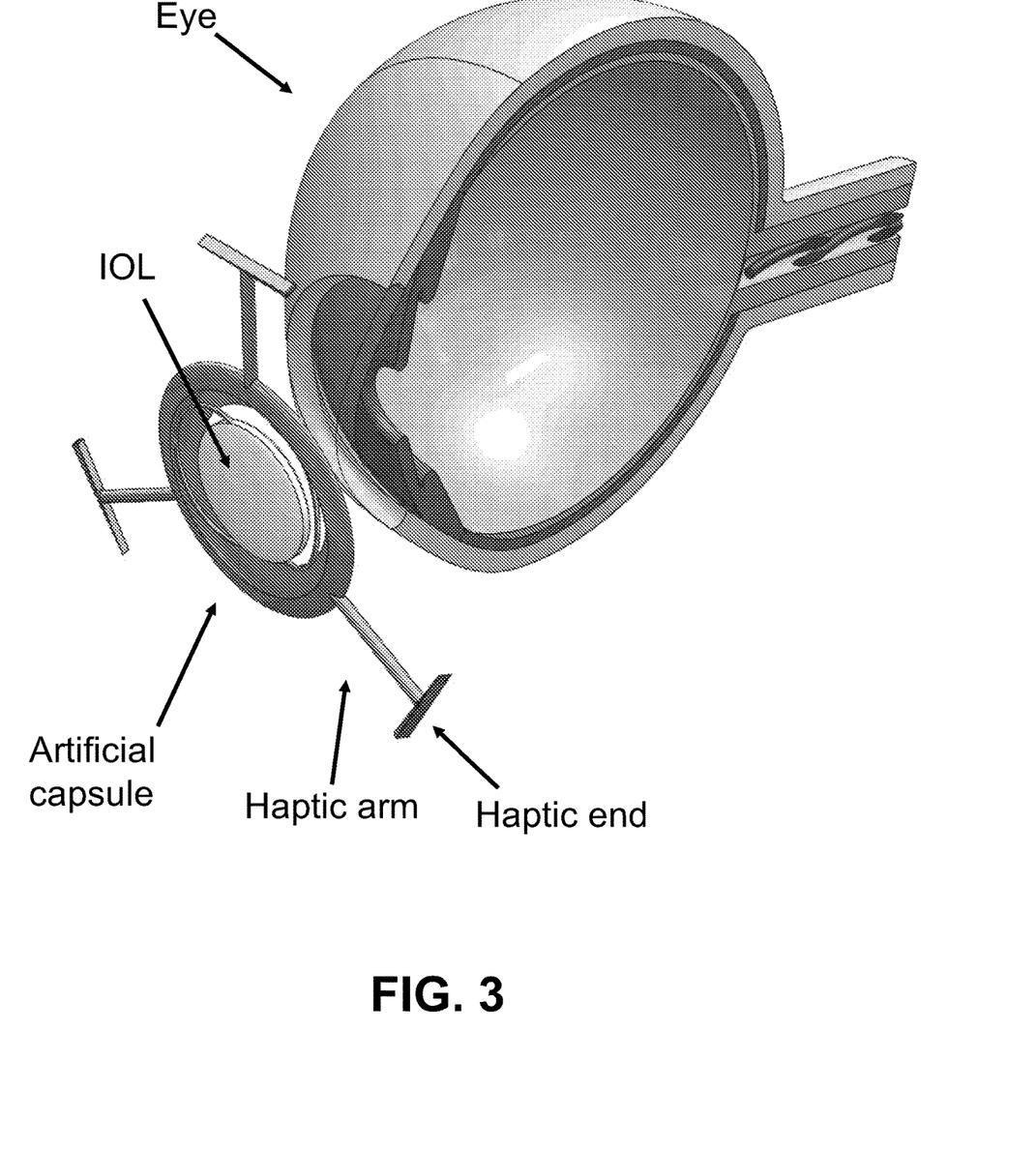
Figure 4:
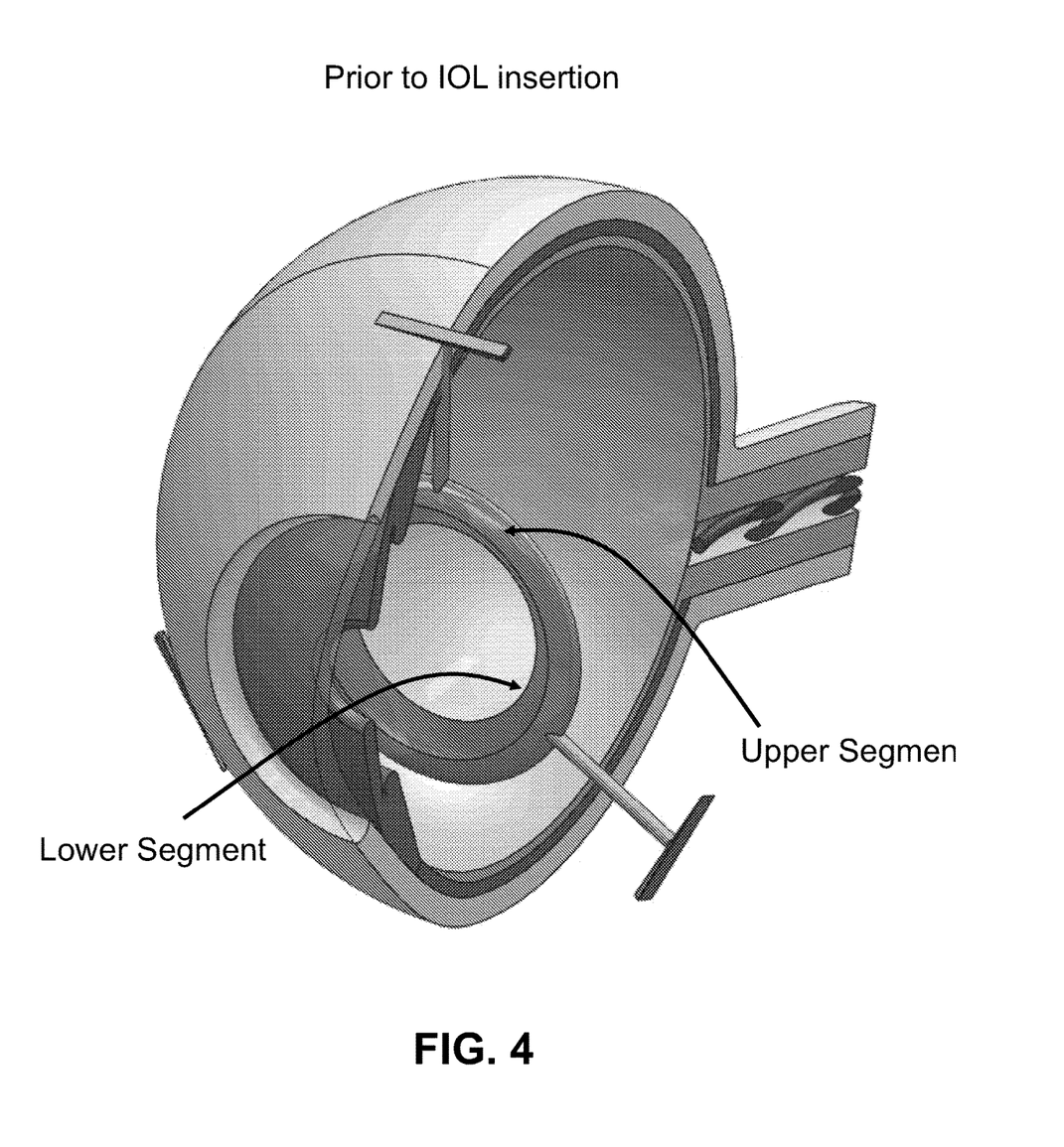

In a first example, the artificial capsule is a single object with two major components (FIGS. 1-4):

1. Circular ring with a central inward facing groove to accommodate the IOL and/or IOL haptics. The circular ring distinguishes:
   a. A lower segment—the flat base of the ring—diameter ranging from 5 mm to 10 mm with a central opening.
   b. An upper segment—overhang above the flat base—diameter ranging from 5 mm to 10 mm with a central opening.
   c. Both segments come together at the periphery in a point or rounded.
2. Haptics
   a. 3 or more haptics.
   b. Each haptics is 0.75 mm to 0.01 mm thick.
   c. The end of each haptic is either T-shaped, anchor-shaped, fish-hook shaped or nail-head-shaped.

Figure 5:
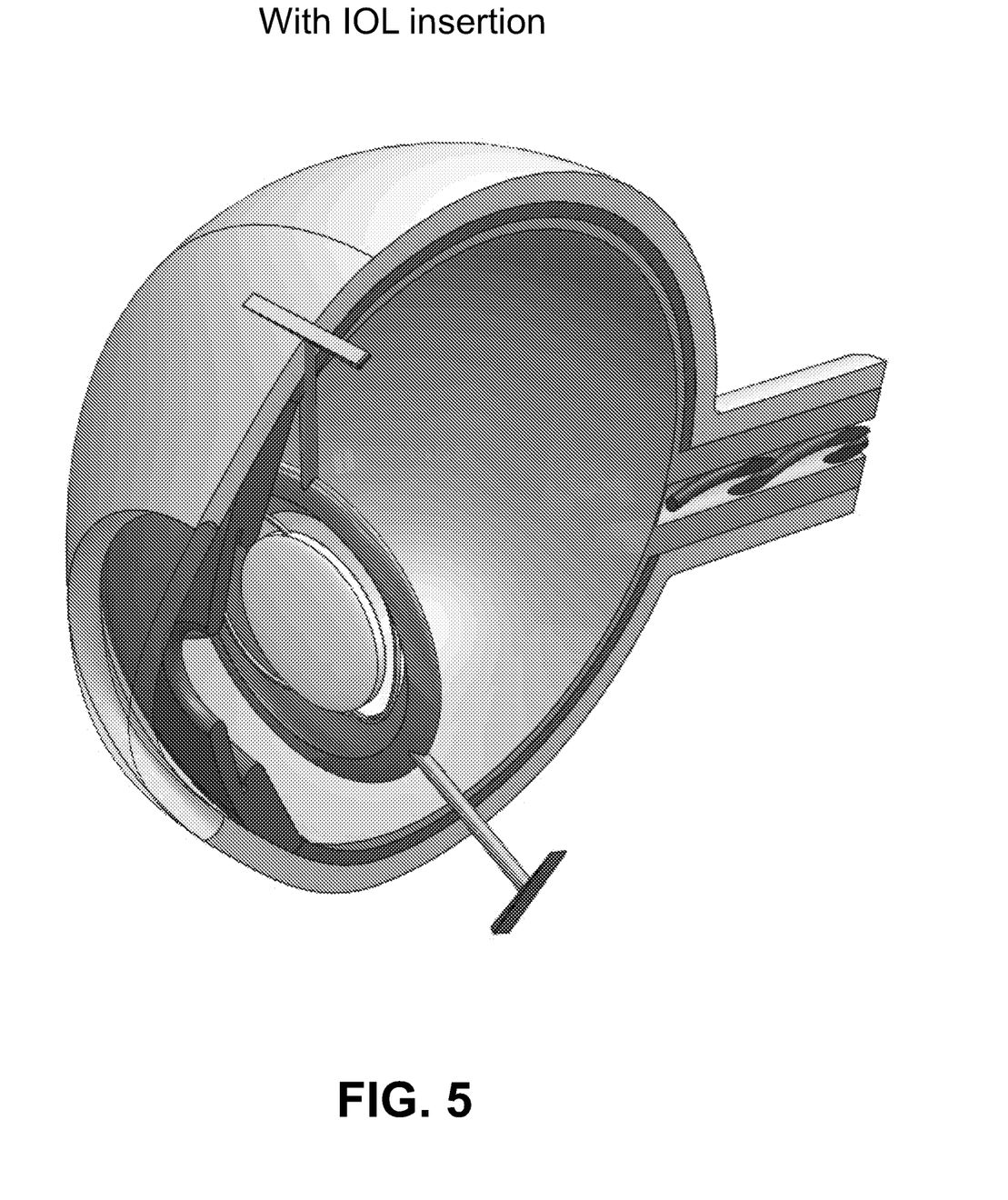
Figure 6:
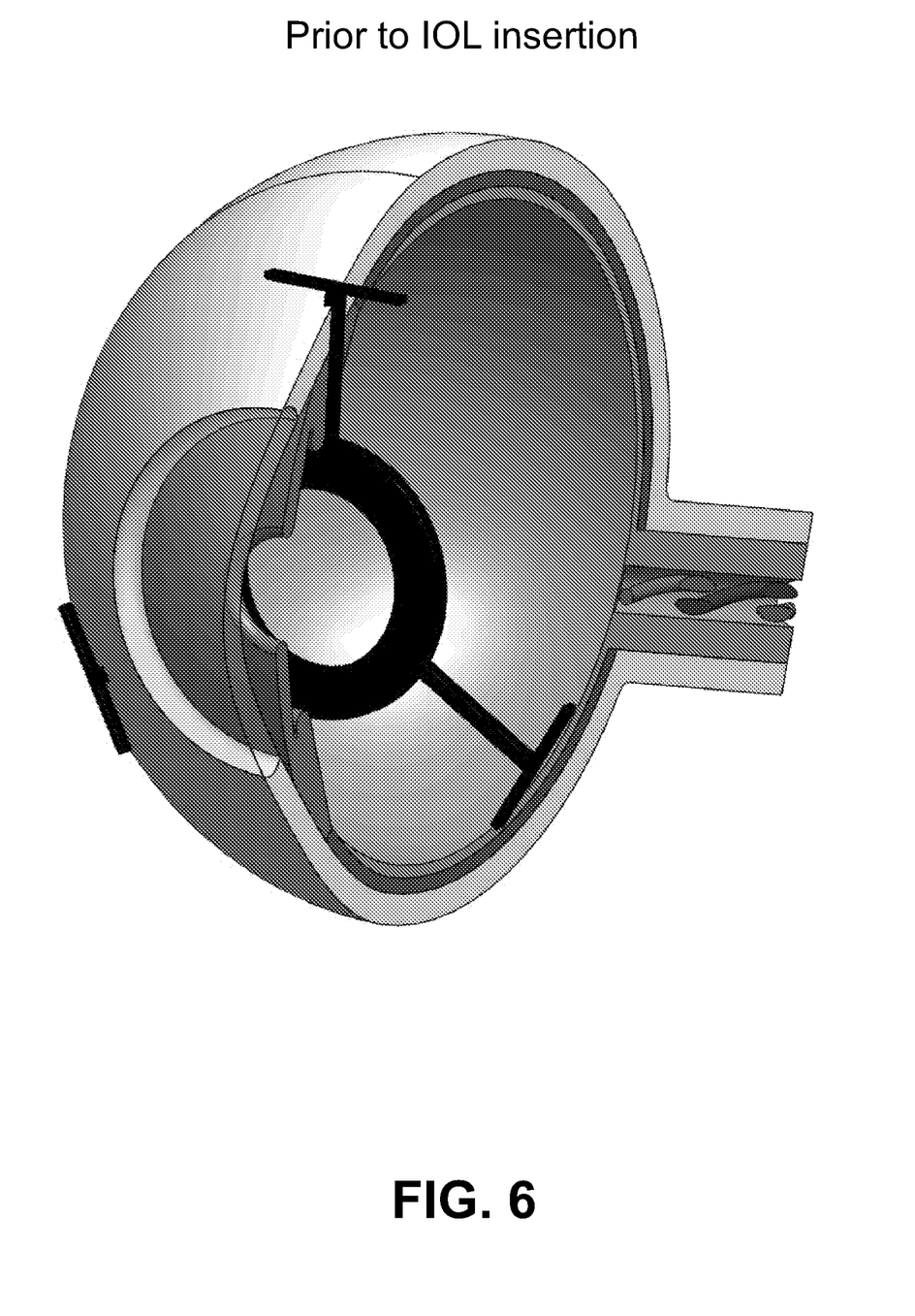
FIGS. 6-10 show the artificial capsule and the physical implementation of the artificial capsule according to a second exemplary embodiment of the invention. The second exemplary embodiment pertains to an artificial capsule that has a flat design with a central opening to accommodate intraocular lens haptics or other intraocular implants.
Figure 7:
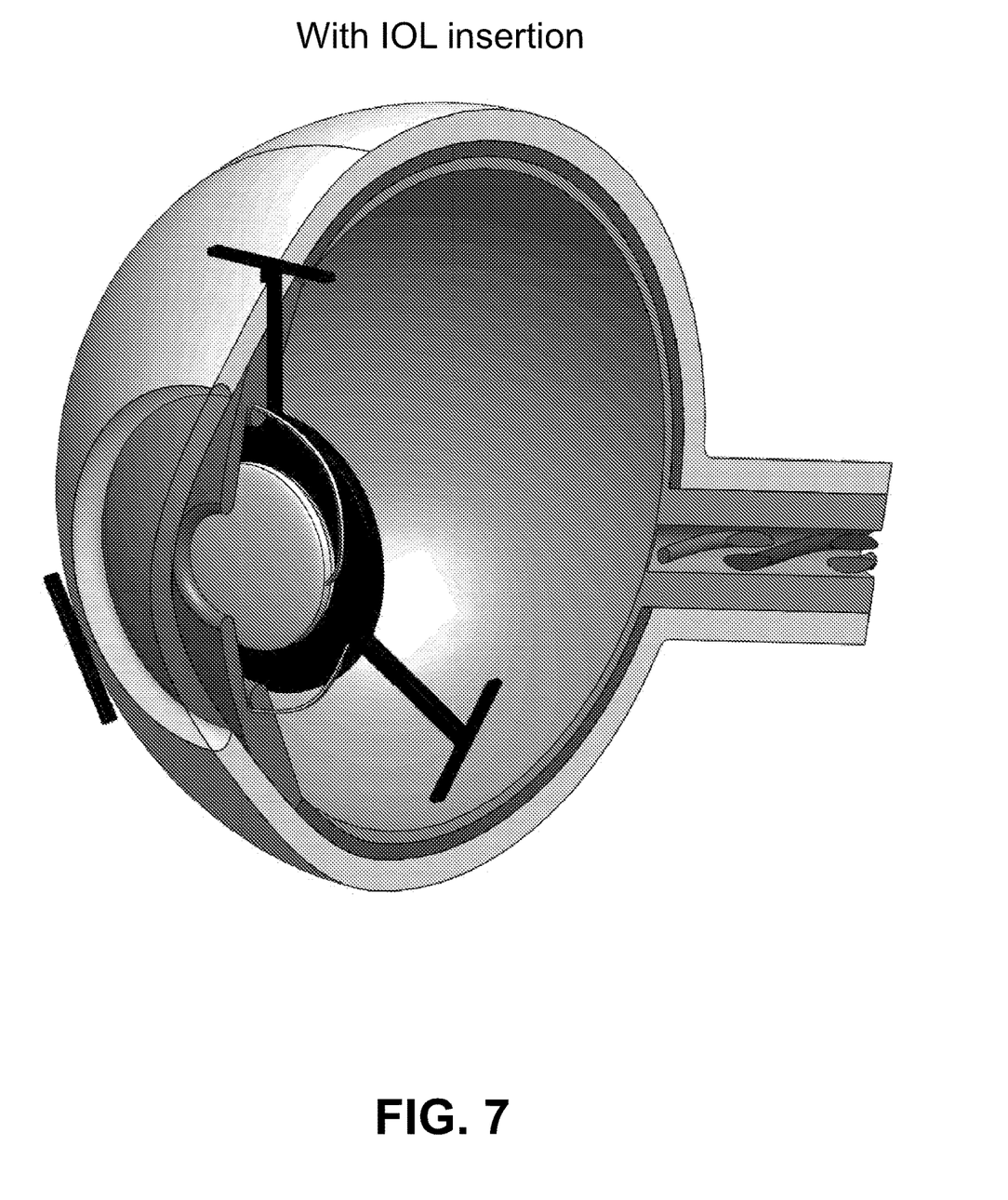
Figure 8:
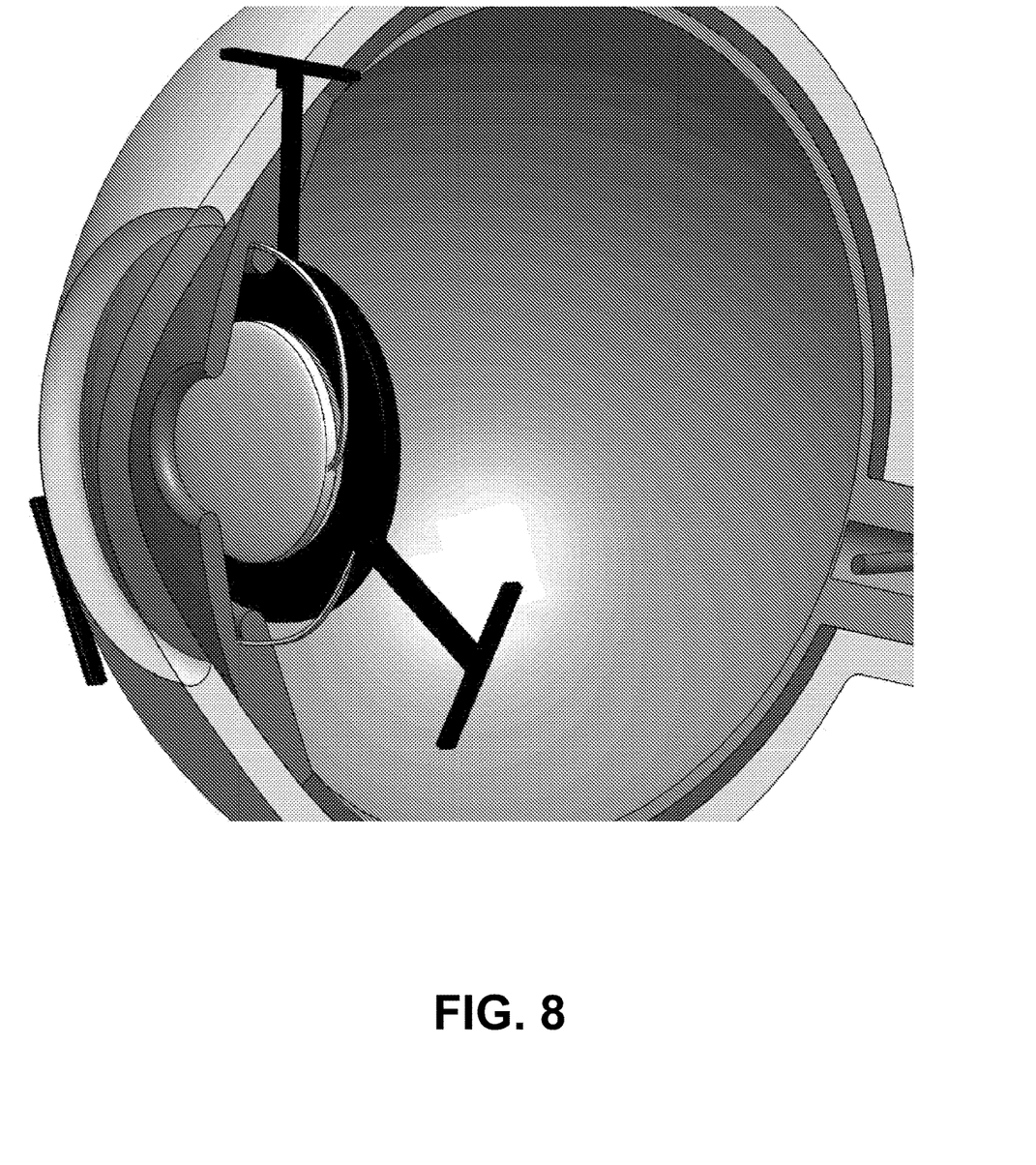
Figure 9:
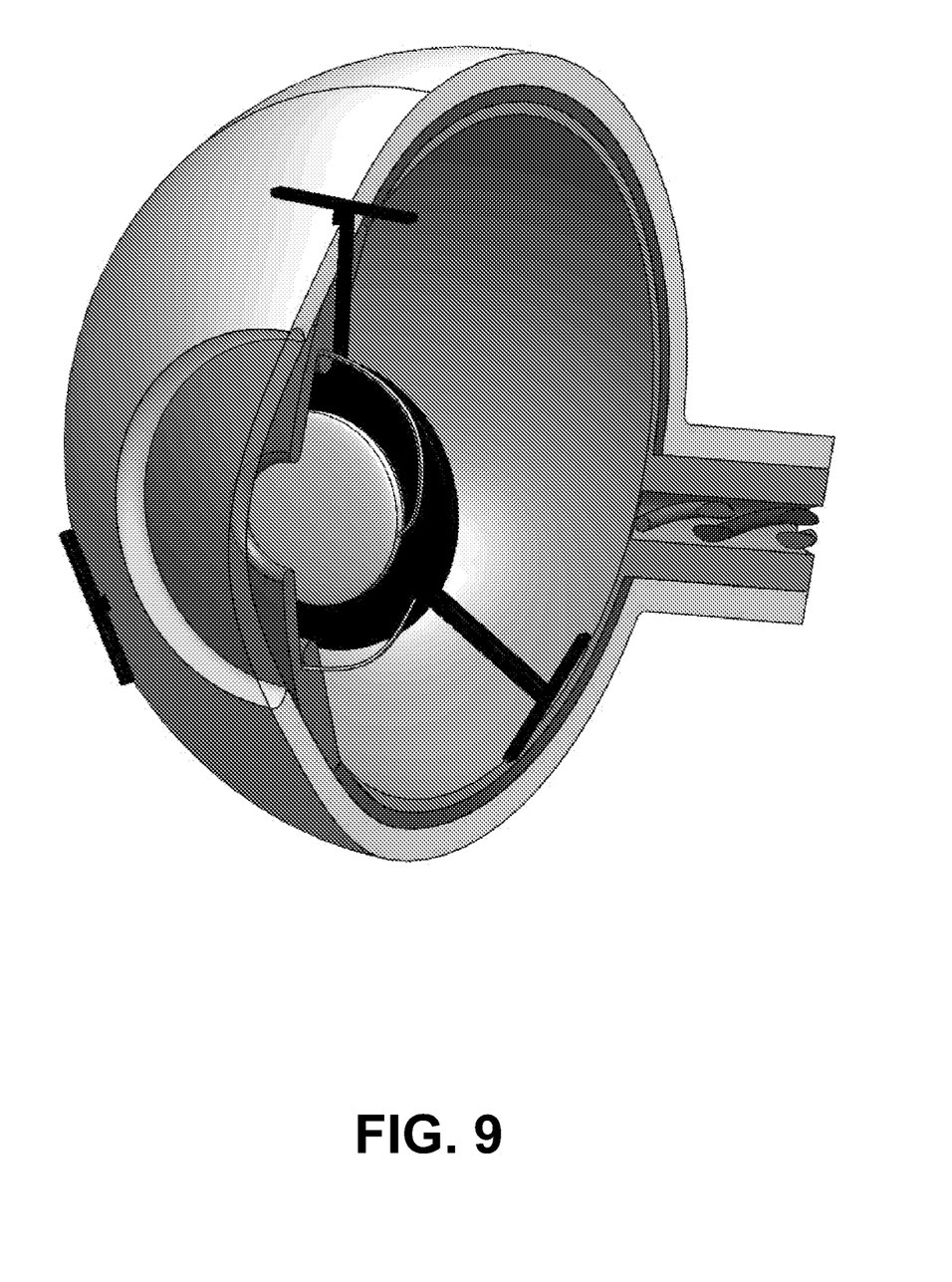
Figure 10:
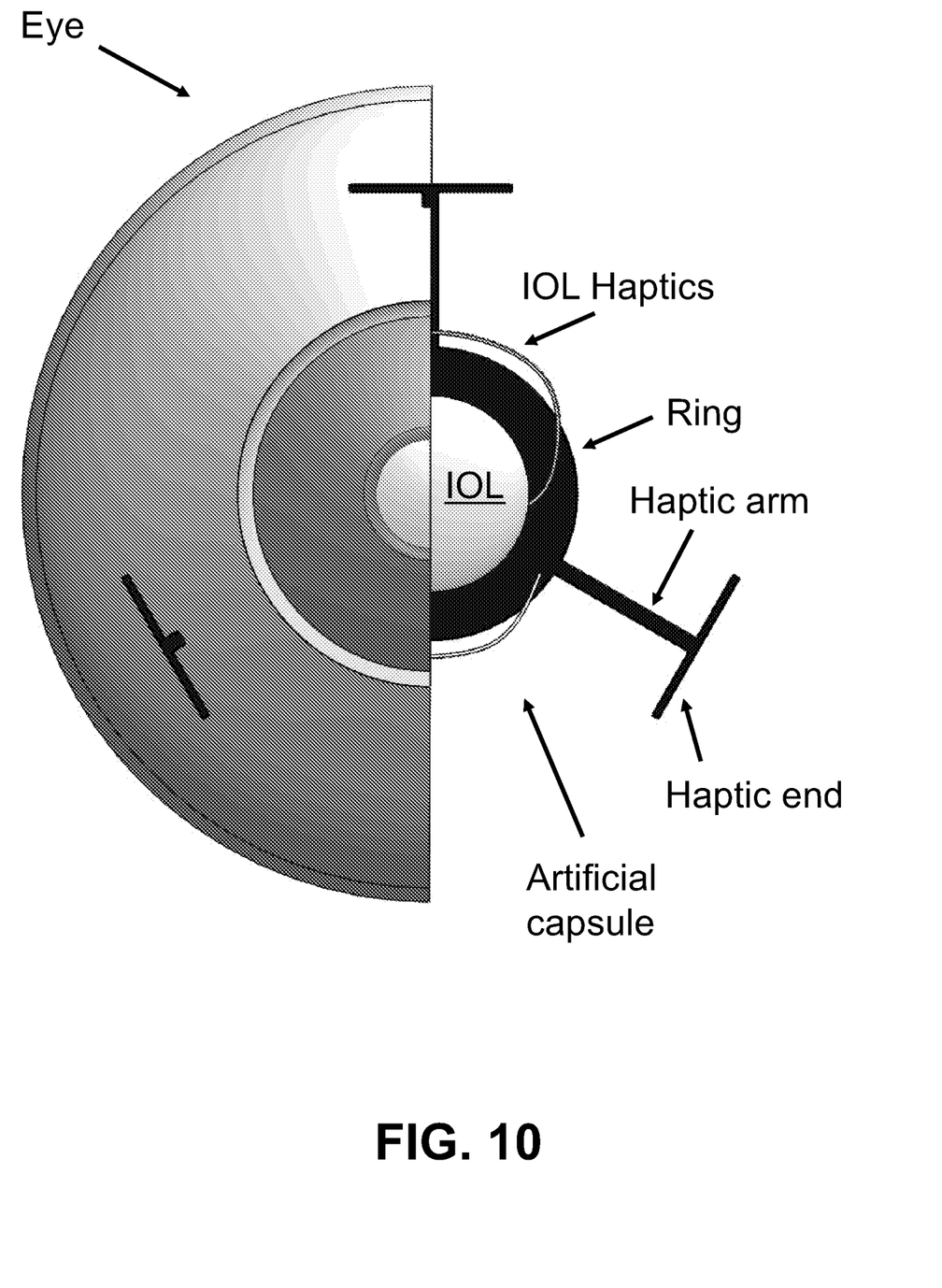

In a second example, the artificial capsule is a single object with two major components (FIGS. 5-10):

1. Flat circular ring where the flat ring part is designed to support IOL and/or IOL haptics.
   a. A single flat disk with a diameter ranging from 5 mm to 10 mm and a central opening.
3. Haptics
   a. 3 or more haptics.
   b. Each haptic is 0.75 mm to 0.01 mm thick.
   c. The end of haptic is either T-shaped, anchor-shaped, fish-hook shaped or nail-head-shaped.

Additional features to the first example could be: a second groove to support an additional implant. Additional features to either example could be an opaque colored overlying disc to serve as an artificial iris, drug eluting ring implant for long term posterior segment drug delivery, biosensor for continuous monitoring of intraocular characteristic (e.g. pressure, glucose, inflammation).

The invention claimed is:

1. An implantable artificial capsule, comprising:
a structure comprising an outer, closed perimeter, a central opening, and a continuous groove for accommodating at least a portion of an intraocular lens; and
at least three haptic arms, wherein prior to implantation, at least one haptic arm of said at least three haptic arms is straight and extends at a substantially orthogonal angle from the outer, closed perimeter of the structure, wherein each haptic arm of said at least three haptic arms comprises only a single trans-scleral anchor for sutureless trans-scleral fixation upon implantation of the implantable artificial capsule in an eye, wherein each of said single trans-scleral anchors is located at a distal end of each of said at least three haptic arms to form a "T" shape.

2. The implantable artificial capsule of claim 1, wherein the structure further comprises a lower segment and an upper segment overhanging the lower segment, said lower segment joining said upper segment at a periphery to form said continuous groove of the structure, wherein said at least a portion of the intraocular lens accommodated by the continuous groove accommodates comprises one or more haptics of the intraocular lens.

3. The implantable artificial capsule of claim 2, wherein the periphery is rounded.

4. The implantable artificial capsule of claim 2, wherein the lower segment is planar.

5. The implantable artificial capsule of claim 4, wherein the lower segment supports a second portion of the intraocular lens.

6. The implantable artificial capsule of claim 2, wherein the lower segment and the upper segment each have an outer diameter that is about 5 mm to about 10 mm.

7. The implantable artificial capsule of claim 2, wherein the central opening of the structure is formed by a first opening through the lower segment and a second opening through the upper segment.

8. The implantable artificial capsule of claim 7, wherein the second opening through the upper segment is larger in diameter than the first opening through the lower segment.

9. The implantable artificial capsule of claim 1, where the continuous groove is inward-facing.

10. The implantable artificial capsule of claim 1, wherein the structure comprises a flexible, biocompatible material.

11. The implantable artificial capsule of claim 10, wherein said flexible, biocompatible material comprises at least one of polymethylmethacrylate and acrylic.

12. The implantable artificial capsule of claim 10, wherein said flexible, biocompatible material comprises silicone.

13. The implantable artificial capsule of claim 1, wherein said structure is opaque or transparent.

14. The implantable artificial capsule of claim 1, wherein upon implantation into an eye, said capsule elutes a drug into said eye.

15. The implantable artificial capsule of claim 1, wherein the implantable artificial capsule comprises a first haptic arm, a second haptic arm, and a third haptic arm and the outer, closed perimeter of the structure has an outer surface.

16. The implantable artificial capsule of claim 15, wherein the first haptic arm begins at a first location along the outer surface of the outer, closed perimeter and ends at a second location opposite the first location of the outer surface, the first haptic arm extending at a substantially orthogonal angle between the first location and the second location, wherein the second haptic arm begins at a third location along the outer surface of the outer, closed perimeter and ends at a fourth location opposite the third location of the outer surface, the second haptic arm extending at a substantially orthogonal angle between the third location and the fourth location, and wherein the third haptic arm begins at a fifth location along the outer surface of the outer, closed perimeter and ends at a sixth location opposite the fifth location of the outer surface, the third haptic arm extending at a substantially orthogonal angle between the fifth location and the sixth location.

* * * * *